(12) United States Patent
Kiser

(10) Patent No.: US 8,770,809 B2
(45) Date of Patent: Jul. 8, 2014

(54) SAFETY LIGHT FOR TRAILERS

(76) Inventor: Lawrence E Kiser, Dayton, OH (US)

( * ) Notice: Subject to any disclaimer, the term of this patent is extended or adjusted under 35 U.S.C. 154(b) by 167 days.

(21) Appl. No.: 13/444,946

(22) Filed: Apr. 12, 2012

(65) Prior Publication Data

US 2012/0268960 A1  Oct. 25, 2012

Related U.S. Application Data

(60) Provisional application No. 61/476,884, filed on Apr. 19, 2011.

(51) Int. Cl.
| | |
|---|---|
| *B60Q 1/34* | (2006.01) |
| *B60Q 1/32* | (2006.01) |
| *F21S 8/10* | (2006.01) |
| *F21V 21/00* | (2006.01) |
| *B60Q 1/22* | (2006.01) |

(52) U.S. Cl.
USPC ............ 362/485; 362/540; 362/545; 362/549

(58) Field of Classification Search
USPC ......... 362/485, 495, 496, 505, 506, 540–545, 362/549; 340/431
See application file for complete search history.

(56) References Cited

U.S. PATENT DOCUMENTS

| | | | | |
|---|---|---|---|---|
| 2,010,374 | A * | 8/1935 | Pissis .............................. | 362/495 |
| 2,197,038 | A * | 4/1940 | Glocksine et al. ............. | 362/485 |
| 5,209,559 | A * | 5/1993 | Ruppel .......................... | 362/485 |
| 5,430,625 | A * | 7/1995 | Abarr et al. .................... | 362/485 |
| 5,682,138 | A | 10/1997 | Powell et al. | |
| 6,095,663 | A * | 8/2000 | Pond et al. ..................... | 362/247 |
| 6,422,728 | B1 * | 7/2002 | Riggin .......................... | 362/540 |
| 6,910,788 | B2 * | 6/2005 | Jones ............................ | 362/506 |
| 7,048,419 | B1 * | 5/2006 | Rodriguez ..................... | 362/485 |
| 8,177,289 | B2 * | 5/2012 | Haire et al. ................ | 296/182.1 |
| 8,480,272 | B2 * | 7/2013 | Day ............................... | 362/487 |

* cited by examiner

*Primary Examiner* — Alan Cariaso
(74) *Attorney, Agent, or Firm* — David L King

(57) ABSTRACT

Trailer illumination device 10 for illuminating a rear wheel assembly 4 of a trailer 2 has a housing structure 16, a plurality of lamps 12 and a circuit means 30. The housing structure 16 is for attachment to a side or bottom of the trailer 2 and has a channel 11 formed by one or more sides of the housing structure 16. When attached to a trailer 2, the device 10 extends from in front of the wheel assembly 4 to past the wheel assembly 4. The circuit means 30 is connected electronically to the rear turn signal light wiring and energizes the lights 12 of the device 10 when the tail lights 3 are on and the turn signal or flasher is activated.

16 Claims, 7 Drawing Sheets

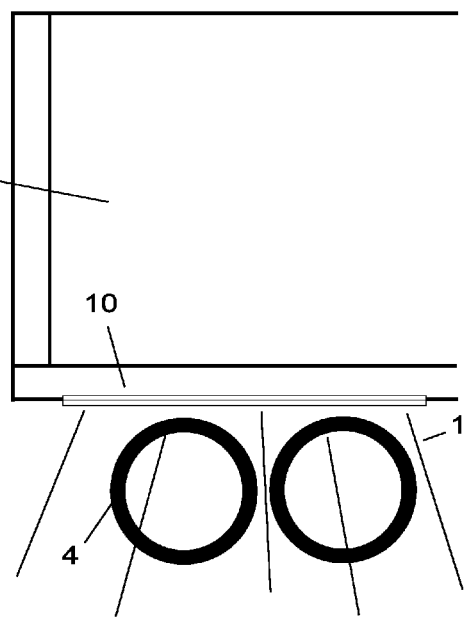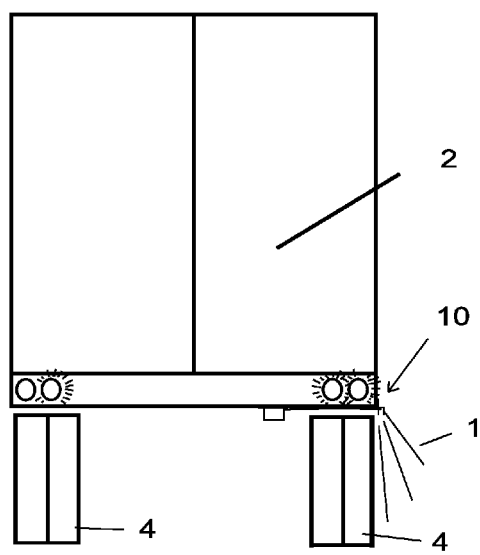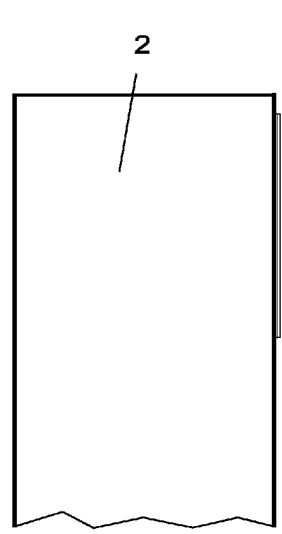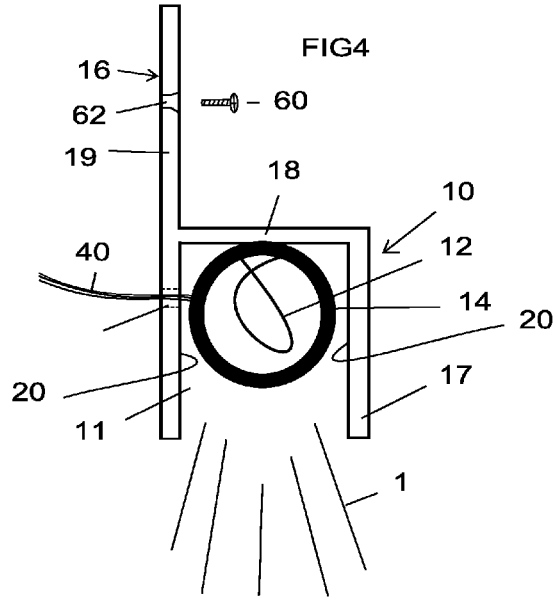

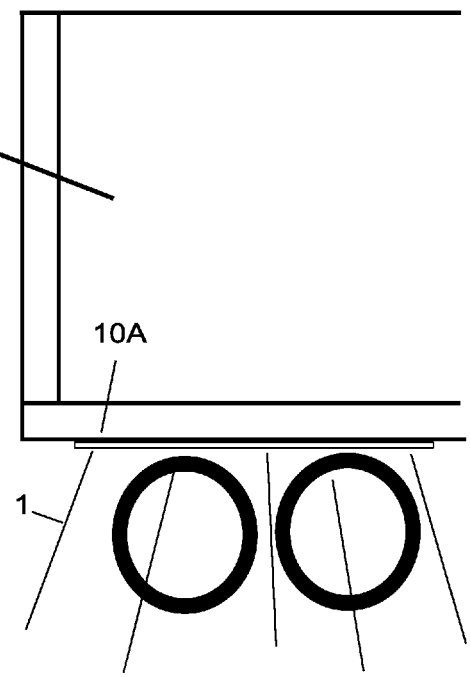
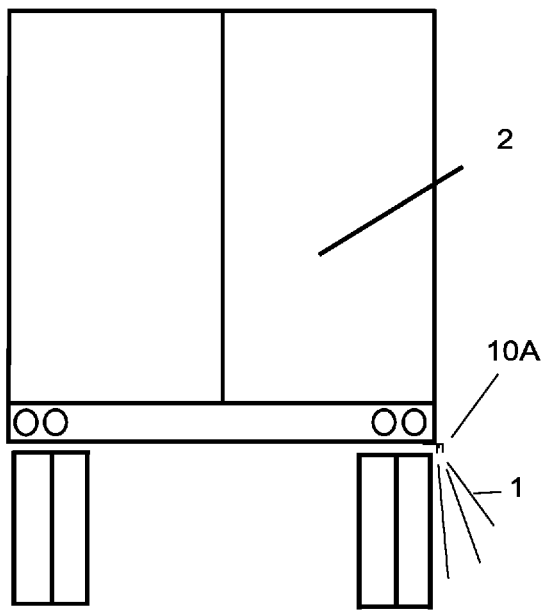
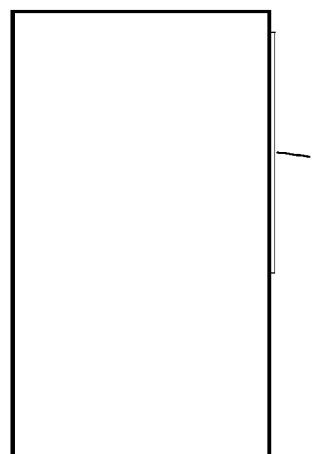
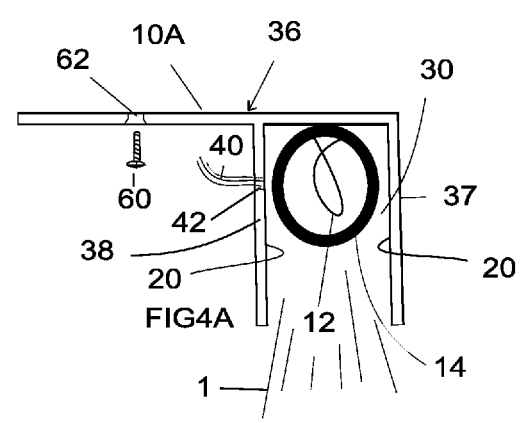

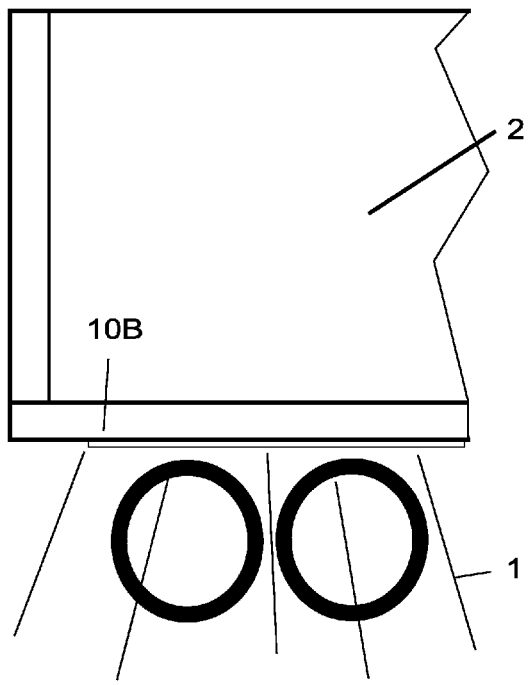
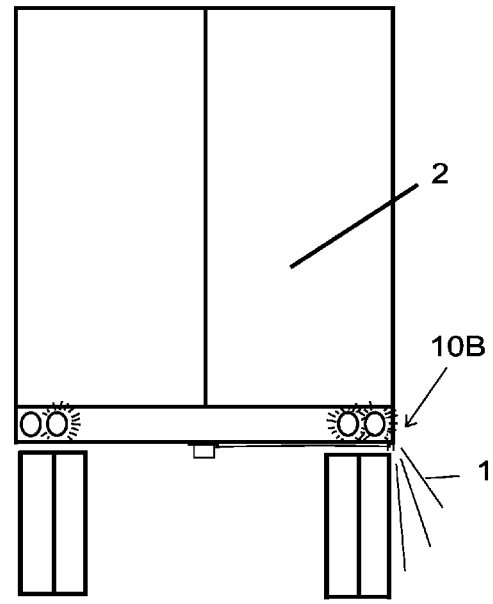
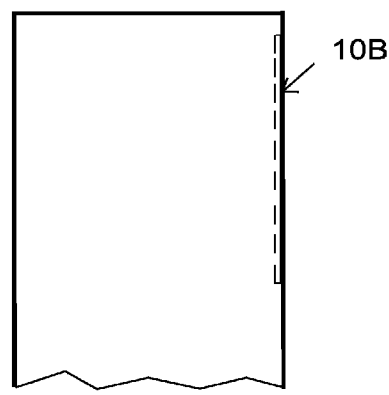
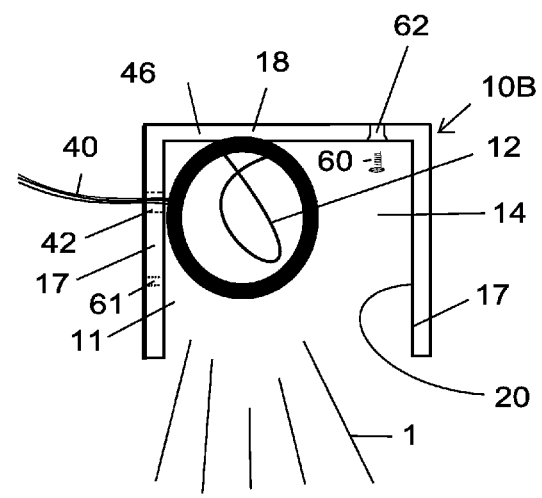

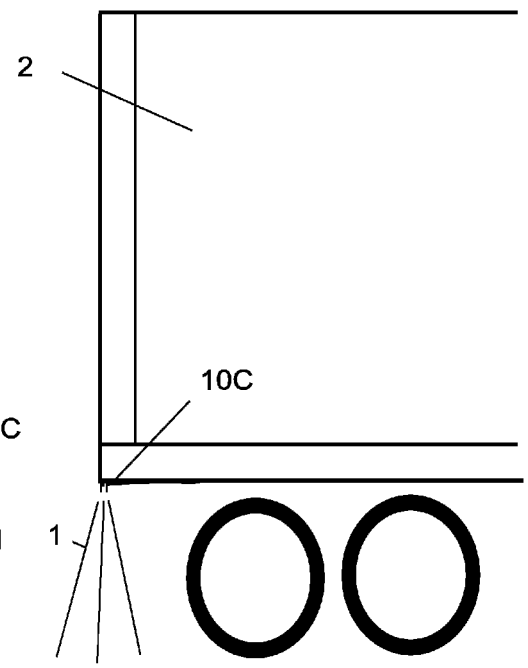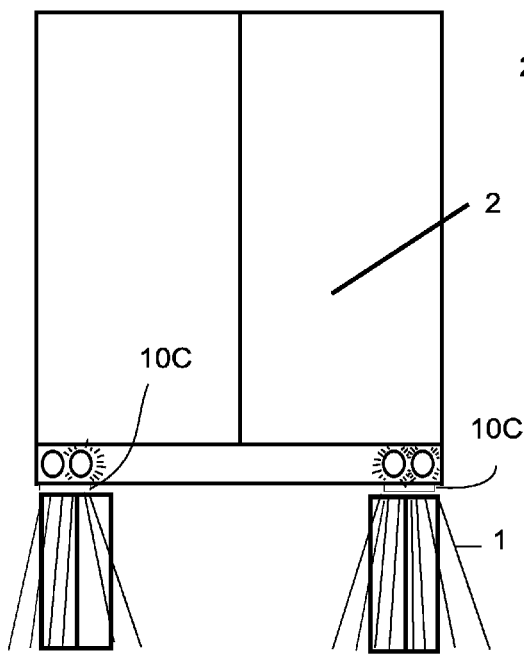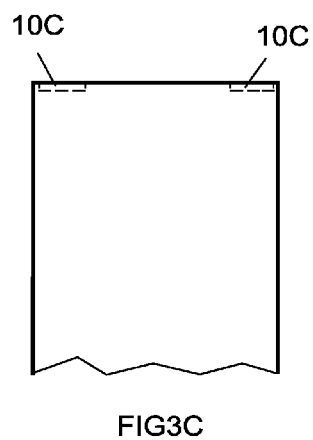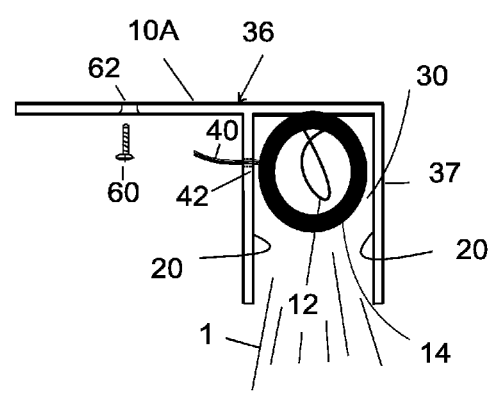

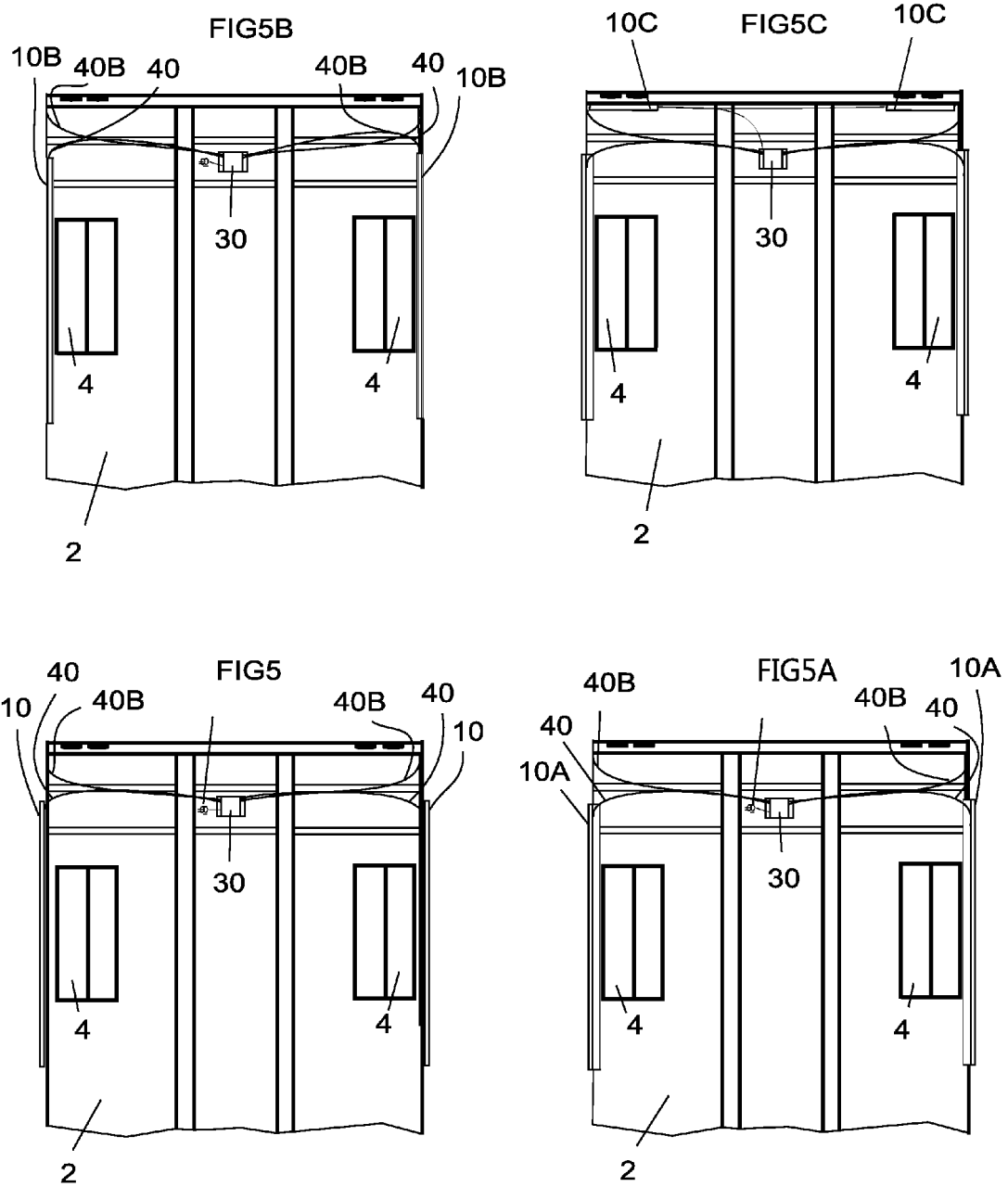

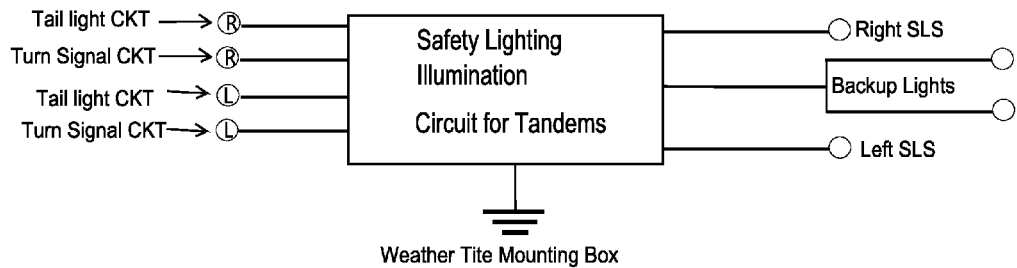
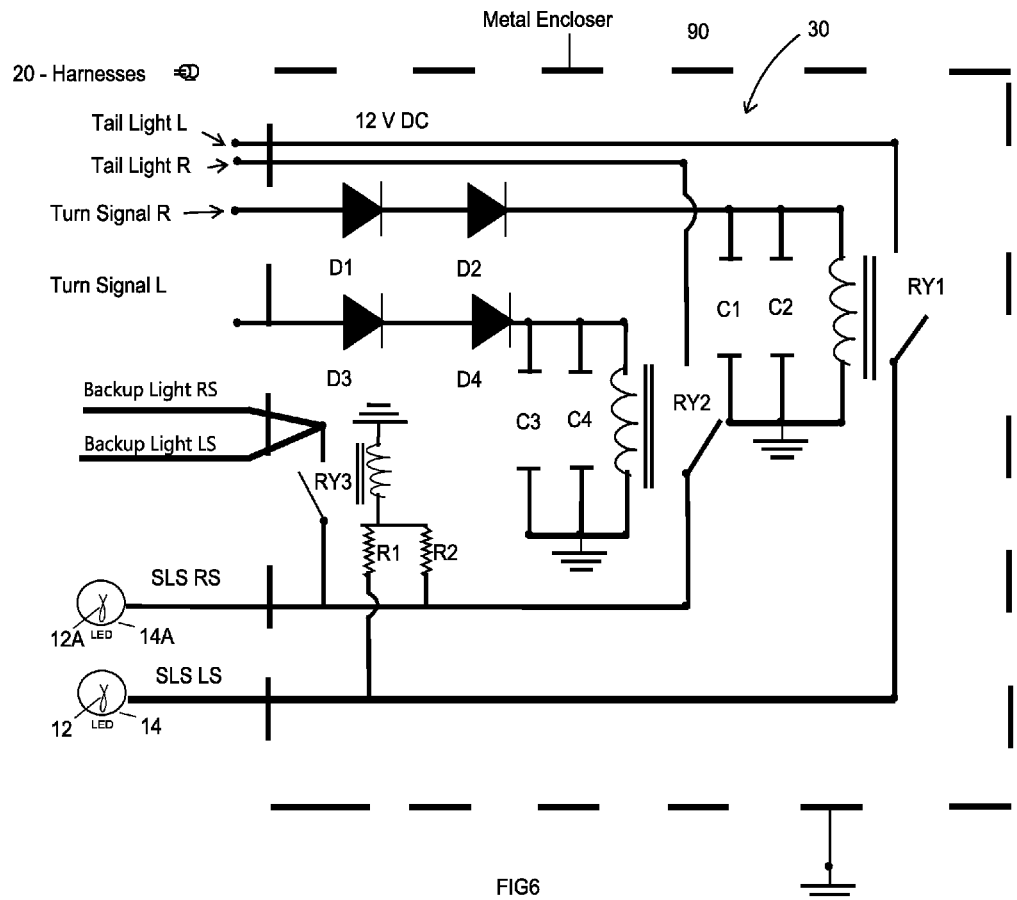
FIG6

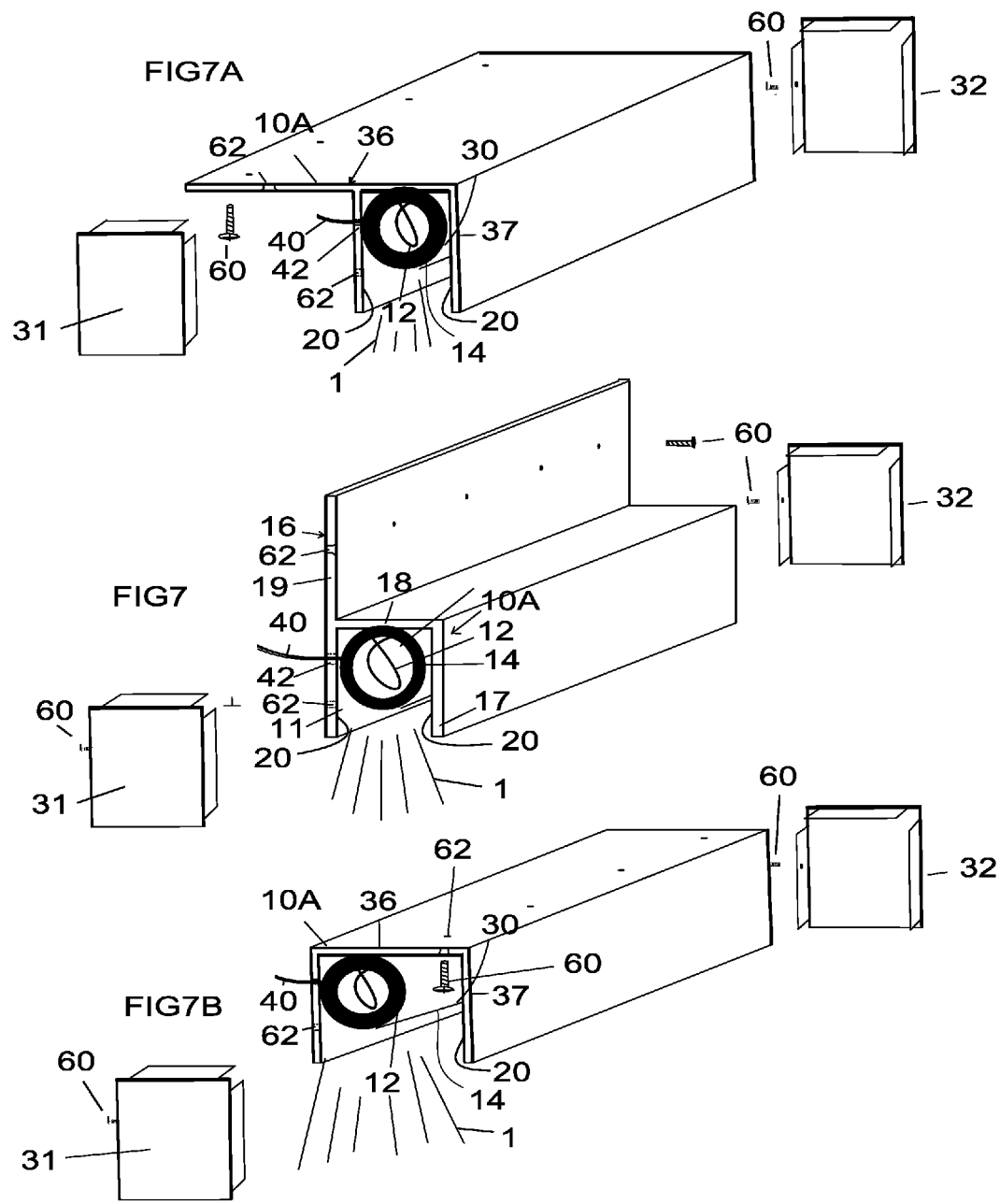

SAFETY LIGHT FOR TRAILERS

RELATED APPLICATIONS

The present invention claims benefit of priority to U.S. Provisional Application 61/476,884 filed on Apr. 19, 2011 entitled "Safety Light For Trailers".

TECHNICAL FIELD

The present invention relates to an illumination device which can be mounted on a trailer above rear wheels to allow the driver of a vehicle to see the wheels at night during turning maneuvers and when backing up.

BACKGROUND OF THE INVENTION

Commercial vehicles, particularly those wherein a tractor and a trailer are used, give the driver particular difficulty when turning or backing up in terms of seeing the rear wheel assemblies. Often these wheels roll up and over curbs or other obstacles which could result in tire damage or even content damage should the load shift severely.

To avoid this problem, it was suggested to provide an illumination system as described in U.S. Pat. No. 5,682,138 entitled "Illumination System For A Semi Trailer Or The Like". The ingenious solution provided one flood lamp in a position rearward of each of the rear wheel assembly. The lamp projected light from behind the wheels toward the curb and ground adjacent the wheels. The lamps were activated when the respective turn signal was used if the tail lamps were on, accordingly, whenever the vehicle was turning right, the lamp would illuminate on the right side of the trailer and; if turning left, would illuminate on the left side of the trailer. This provided the driver a look at the ground behind and beside the rear wheels, but not directly in front of the wheels which were still in the dark.

Another problem with this method of illuminating the rear wheels was the light or lamp was set up to shine outwardly and this, while clearly illuminating the curb, was blinding to others particularly cars in cross traffic when the trailer made a left hand turn and to some lesser extent blinded the truck driver as the light bounced off his mirror. Secondarily, the illumination assembly placed the lamps in a position that allowed stones to be propelled from the tread of the rear wheels directly onto the lamp. These and other issues made this solution less than desirable.

An even bigger negative aspect was this prior art concept was not an attractive design and was simply a utilitarian solution. This greatly ignored the fact that commercial truck drives enjoy adding decorative features to accent their large investment in their vehicles. Owners of such vehicles will pay for practical solutions, but not at the expense of the appearance of their vehicle.

Accordingly, the present invention provides a unique way to provide superior illumination to the rear wheel assembly illuminating the ground along the outboard side of the rear wheel assembly as well as in front of the tires and behind the tires while avoiding any blinding glare. Secondarily, this illumination device is easily installed onto the trailer in a simple and very cosmetically appealing way to make it an attractive addition to the trailer.

These and other benefits of this illumination device are described as follows.

SUMMARY OF THE INVENTION

Trailer illumination device for illuminating a rear wheel assembly of a trailer has a housing structure, a plurality of lamps and a circuit means. The housing structure is for attachment to a side or bottom of the trailer and has a channel formed by one or more sides of the housing structure. When attached to a trailer, the device extends from in front of the wheel assembly to past the wheel assembly. The plurality of lamps are mounted in one or more rows in the channel of the housing structure. The circuit means are connected electronically to the rear turn signal light wiring. The circuit means energizes the lights of the device when the tail lights are on and the turn signal or flasher is activated. The turn signal activates one illumination device on the side of the trailer in the direction of a turn whereas the flasher activates two illumination devices, one on each side of the trailer to facilitate backing up or emergency stops. The housing structure provides an illumination barrier or shield allowing the one or more rows of lights to emit light directed downwardly from inside the channel towards the ground preventing sideways illumination glare.

The plurality of lamps are either light emitting diodes or halogen lamps. These lamps are preferably encased in an acrylic or clear plastic tube or cover inside the channel. The housing structure forming channel, preferably, has an inside polished or highly reflective surface. The circuit means is also preferably positioned in the channel. The housing structure can be an extrusion having a flange for attachment to the side or bottom of the trailer. The housing structure can be an "h" shaped extrusion for side mounting to the trailer. Alternatively, the housing structure can be an "F" or "U" shape extrusion for bottom mounting to the trailer. The housing structure preferably has an opening for passing wiring from the circuit means out of to provide a means to connect to the existing wiring for the rear lights of the trailer.

In one alternative embodiment, the illumination device is attached to the rear of the trailer to illuminate the back area of the trailer, preferably two devices, one on each side of the rear of the trailer.

BRIEF DESCRIPTION OF THE DRAWINGS

The invention will be described by way of example and with reference to the accompanying drawings in which:

FIG. 1 is a side view of the "h" style channel preferred embodiment illumination device of the present invention shown attached to a trailer.

FIG. 1A is a side view of the "F" style channel embodiment illumination device of the present invention shown attached to a trailer.

FIG. 1B is a side view of a "U" style channel embodiment illumination device of the present invention shown attached to a trailer.

FIG. 1C is a side view of the device when configured to illuminate the rear of the trailer.

FIGS. 2, 2A, 2B and 2C are rear views of the device of the present invention shown attached to a trailer.

FIGS. 3, 3A, 3B and 3C are top views looking downwardly at the device shown mounted on a side of a trailer.

FIGS. 4, 4A, 4B and 4C are end views of each device embodiment.

FIGS. 5, 5A, 5B and 5C are bottom views of the trailer showing the device wired to the trailer lights.

FIG. 6 is a schematic wiring diagram of the circuit means.

FIGS. 7, 7A and 7B are views of the device made with a housing structure of an "h", an "F" or "U" shaped extrusion respectively with end caps shown removed from the housing structure.

DETAILED DESCRIPTION OF THE INVENTION

With reference to FIGS. 1, 2, and 3; a side view, end view and top view of a typical exemplary trailer 2 is illustrated. The trailer 2 has an illumination device 10 mounted directly above the rear wheel 4 assemblies as illustrated. As shown in the side view FIG. 1, the illumination device 10 projects light 1 downwardly in front of, along the side of and behind the tandem wheel assembly 4 so that a driver when making a turn at night can easily see the wheels 4 and the ground adjacent the wheels 4. As shown in the rear view FIG. 2 and FIG. 4, the illumination device 10 has a profile made in the shape of an "h", this housing support structure 16 is preferably made of an extrusion of aluminum or similar non-corrosive material that can be bolted directly onto and fastened directly onto the side of the trailer 2 as illustrated. The exterior of the extrusion preferably has a brushed or polished appearance to match the trailer for cosmetic appeal. The device 10 has a channel 11 in which one or more rows of lamps 12 are positioned along the length of the housing structure 16. These lamps 12 are encased in a clear protective acrylic tube or plastic cover 14 in such a way that the lamps 12 are protected from any debris or weather such that the lamps 12 can provide illumination without any interference from the elements. As shown, the interior surface of the channel 11 on the housing structure 16 is preferably provided with a reflective coating 20 or a polished surface so that the light 1 bouncing off the reflective surface is directed downwardly onto the ground adjacent the wheels 4.

As shown in FIG. 4, a cross sectional view of the device 10 is illustrated showing the lamp 12, the covering 14 all positioned and located inside the channel 11 wherein a barrier or shield is formed by that portion of the housing structure 16 extending downwardly and identified by reference numeral 17. This side 17 of the housing structure 16 blocks the light 1 emitted from the channel 11 from being projected outwardly in such a fashion that it prevents the light 1 from becoming a distraction to oncoming traffic or passersby and prevents the light itself from creating a glare in the mirrors to obstruct the vision of the driver of the truck. This is particularly important when the driver is trying to back the vehicle up using the mirrors or when a driver is trying to look at a mirror during a turning maneuver. The side 17 is connected to a horizontal top 18 which is connected to the vertical flange 19 of the housing structure 16. The vertical side 19 of the "h" shaped structure can be placed flush against the side of a trailer 2, as illustrated. This provides a very easy way to fasten the device 10 to any trailer 2 using fasteners 60 passing through holes 62.

With reference to FIG. 4, the exemplary housing structure 16 has the side 17 about 9/16 of an inch tall and the vertical side 1 3/16 inches tall and the top 18 about 9/16 inch so the channel 11 is only about 0.5 inches wide by 0.5 inches deep. The overall length of the device is 48 inches to 72 inches. The structure thickness is preferably about 1/16 inch or greater. It is understood that these sizes can be altered to any desired size. As further shown, wiring 40 extends from the lamps 12 outward through the opening 42.

With reference to FIGS. 1A, 2B, 3A and 4A; an alternative embodiment illumination device 10A is shown. This device 10A has a "F" shaped housing structure 36 which can be attached to the underside of the trailer 2 as shown in FIGS. 1A, 2A and 3A. Otherwise the illumination device 10A is almost identical to device 10. The "F" shape structure 36 has the sides 37 and 38 about 13/16 of an inch and the top 36 about 1 3/8" leaving the channel 11 about 0.5 inches wide and about 0.625 inches deep. Again, as before, these dimensions can be varied as a matter of design choice. The device 10A is preferably 48 inches to 72 inches in length.

In a third embodiment shown in FIGS. 1B, 2B, 3B and 4B; an illumination device 10B is shown having a "U" shaped housing structure 46. This structure 46 has a top 18 about 1 1/8 inches across and two sides 17 each 5/8 inches tall with a channel 11 of about 1.0 inches wide. In this embodiment, the lamps 12 are offset to one side as illustrated. This offset facilitates assembly to the underside of the trailer using screws 60 through the holes 62 as shown in FIG. 4B.

In FIGS. 1C, 2C, 3C and 4C; a fourth embodiment illumination device 10C is shown. This device 10C is preferably used in pairs, one device 10C on each rear side of the trailer 2. These illumination devices 10C are used for illuminating the rear of the trailer 2 as shown. As shown, the "F" shaped housing structure 36 is used; however, any of the "h" or "U" shaped structures could be used. Each device 10C is at least 12 inches, preferably 18 inches to 24 inches in overall length.

With reference to FIGS. 5, 5A, 5B and 5C, the illumination devices 10, 10A, 10B and 10C respectively are shown attached to the trailer 2 looking upwardly to the underside. The wiring 40 is shown spliced into the tail light wiring and placed in a sealed electrical box 90. This powers the lighting circuit means 30 for the devices 10, 10A, 10B and 10C. As shown in FIG. 6, the preferred wiring schematic is shown.

In the circuit diagram of FIG. 6, it is illustrated that when the turn signal is turned on while the tail lamps are on, it starts an input to the voltage in which instantly travels to the safety illuminating lights. through D1 Diode and charges the system of the Hold circuit of the capacitors C1, C2 and will hold the voltage on RY1 closing the contacts to apply voltage to the lamps 12 lighting up the area around the tandem wheels 4 on the trailer 2. Every time there is a pulse of voltage from the turn signal this will keep the Holding circuit in FIG. 6 energized to be applied to the relay allowing the lighting system 10 to remain continuously lit. Once the turn signals off, the lights 12 will also shut off and no additional pulses are being sent to the circuit.

With reference to FIGS. 7, 7A and 7B perspective views of the illuminating device 10, 10A and 10B made according to the present invention are shown. The device 10, 10A, 10B at the flange 19 can be provided with mounting holes 62 for fasteners 60 to secure the device to the trailer. More preferably, these holes can be made on assembly to the trailer and the device flange 19, 36 or top 18 simply providing a smooth surface which can be drilled upon installation. As shown, removed from the devices 10, 10A, 10B are two end caps 31 and 32. These end caps 31, 32 close the leading and trailing open ends of the housing structures to further protect the lamps 12, leaving only the downward facing opening for illumination of the ground below. In a bottom view 5, 5A, 5B and 5C, it can be seen that there is an electrical box 90, inside of which is a circuit means 30 attached to the device 10, 10A, 10B or 10C to enable the devices to be connected through an opening 42 in the channel 19 where wires 40 pass and are to be connected to the wiring of the weatherized enclosure or box 90. Wires 40B connect to tail light wiring under the trailer 2. In the circuit diagram of FIG. 6, it is illustrated that when the turn signal is turned on while the tail lamps 3 are on, it starts an input to the voltage in which instantly travels to the safety illuminating lights.

Similarly, when the operator turns his emergency flashing lights on, a similar lighting will occur, in this case both the illuminating devices 10 will operate lighting both sides of the trailer 2 wherein wheels 4 on both sides can be illuminated fully as the operator is backing up, in this fashion he can see out either mirror an illuminated set of wheels 4 if so desired. While the device 10 can be used only on one side, preferably the right hand side, it is recognized that it can be mounted on both sides when so desired. The advantage of the present design is that it prevents any scattered light from annoying drivers particularly on the left hand side of the vehicle during a turning maneuver. This is true because the lighting occurs in a pattern that shines directly downward and not into the face of pedestrians or oncoming traffic as was done in the prior art.

While the preferred embodiment illuminating device 10 was made with an "h" shaped extrusion literally extending and attached to the side of the trailer 2, it is also recognized that the housing structure 16 can alternatively be made in an "F" or "U" shaped extrusion. When using an "F" or "U" shaped extrusion, the illuminating device 10 can be mounted from the bottom of the trailer 2 with the open part of the "F" or "U" being directed downwardly so that the lamps 12 will again direct their illumination towards the ground adjacent the wheels 4. It is important to note that his alternative configuration provides for mounting directly under the trailer 2. This provides the added capability of making the illuminating device 10, 10A or 10B potentially flush with the trailer 2. Alternatively, although the device 10 is shown mounted on the side of the trailer in FIGS. 1, 2 and 3 and projected outwardly therefrom, it is understood that the device could be turned around such that the flange 19 and top surface 18 could interlock onto the side and bottom of the trailer 2 wherein the entire device 10 would then be fundamentally flush mounted on the side of the trailer 2 with almost no portions of the device 10 projecting outwardly except the flange 19. This is possible particularly when the tandem wheels 4 are somewhat inwardly and below the bottom of the trailer 2 with sufficient clearance. In this condition, it is possible that removal and replacement of tires 4 can occur without any interference with the illumination device 10. This mounting is clearly a possible alternative to figures as shown. Alternatively, it is also possible when the device 10A is mounted directly under the trailer 2 using the "F" shaped housing structure 16A. The advantage of mounting directly under the trailer 2 is that the device 10 is not projecting outwardly and it cannot be snagged or caught in any fashion should the trailer 2 rub up against an obstacle. This would generally not impact the illumination device 10, 10A in any fashion as it is protected by the trailer. In either occurrence, it is understood that the housing structures 16 can be made of a brushed aluminum material and can have a highly reflective surface similar to that along the boundaries of the trailer such that it provides a cosmetically appealing addition to the trailer 2 assembly and as such provides a low-cost way of enabling a driver to see the rear tandem wheels 4 during both turning and backing up maneuvers.

While the lamps 12 are shown in a single row, it is understood that they could be provided in two or more rows if so desired. Alternatively, these lamps 12 as illustrated are preferably made of LED (light emitting diodes) lights that are relatively small in size requiring very little voltage. Alternatively, the lamps 12 can be small halogen lamps mounted into the device 10, as illustrated. If the use of halogen lamps provides a significantly larger amount of illumination per lamp therefore less lamps may be required, however, in either event regardless of the type of lamp being used, the channel 11 created for housing and storing the lamp 12 assembly prevents any of the light scatter to direct upwardly or along the sides and forces the light to be directed downwardly into the area wherein it is most needed. Additionally, to provide added cosmetic appeal, the lamps 12 could be colored emitting a red, amber, blue or green light too. The lamps 12 could even be substituted with neon type lighting if so desired.

As shown, the pair of rear mounted illumination devices 10C can be used in combination with the other side mounted devices 10, 10A and 10B or can be used separately as illustrated in FIGS. 1C, 2C, 3C, 4C and 5C. All of these devices provide excellent ground illumination while avoiding annoying side view glare.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described, which will be within the full intended scope of the invention as defined by the following appended claims.

What is claimed is:

1. A trailer illumination device for illuminating a rear wheel assembly of a trailer comprises:
   a housing structure, the housing structure being an extrusion having a flange for attachment to a side of the trailer, the extrusion being "h" shaped for side mounting to the trailer, the housing structure having a channel formed by one or more sides of the housing, when attached to a trailer, extending from in front of the wheel assembly to past the wheel assembly;
   a plurality of lamps mounted in one or more rows in the channel of the housing structure;
   a circuit means connected electronically to the rear turn signal light wiring, the circuit means energizes the plurality of lamps when tail lights of the trailer are on and a turn signal or flasher is activated, the turn signal activates one illumination device on the side of the trailer in the direction of a turn whereas the flasher activates two illumination devices, one on each side of the trailer to facilitate backing up or emergency stops; and
   wherein the housing structure provides an illumination barrier or shield allowing the one or more rows of lights to emit light directed downwardly from inside the channel towards the ground preventing sideways illumination glare.

2. The trailer illumination device for illuminating a rear wheel assembly of a trailer of claim 1 wherein the plurality of lamps are light emitting diodes.

3. Trailer illumination device for illuminating a rear wheel assembly of a trailer of claim 1 wherein the lamps are halogen lamps.

4. The trailer illumination device for illuminating a rear wheel assembly of a trailer of claim 1 wherein the housing structure forming channel has an inside polished or highly reflective surface.

5. The trailer illumination device for illuminating a rear wheel assembly of a trailer of claim 1 wherein the lamps are encased in an acrylic or clear plastic tube or cover inside the channel.

6. The trailer illumination device for illuminating a rear wheel assembly of a trailer of claim 1 wherein the housing structure has an opening for passing wiring out of said opening to provide a means to connect to wiring of rear lights of the trailer.

7. The trailer illumination device for illuminating a rear wheel assembly of a trailer of claim 1 wherein the extrusion has a "U" shape extrusion portion.

8. The trailer illumination device of claim 1 further comprises:
   a pair of rear illumination devices for attachment to the rear of a trailer, one device for a left side and one for a right side of the rear of the trailer for back up illumination.

9. A trailer illumination device for illuminating a rear wheel assembly of a trailer comprises:

a housing structure, the housing structure being an extrusion having a flange for attachment to a bottom of the trailer, the extrusion being "F" shaped for bottom mounting to the trailer, the housing structure having a channel formed by one or more sides of the housing, when attached to a trailer, extending from in front of the wheel assembly to past the wheel assembly;

a plurality of lamps mounted in one or more rows in the channel of the housing structure;

a circuit means connected electronically to the rear turn signal light wiring, the circuit means energizes the plurality of lamps when tail lights of the trailer are on and a turn signal or flasher is activated, the turn signal activates one illumination device on the side of the trailer in the direction of a turn whereas the flasher activates two illumination devices, one on each side of the trailer to facilitate backing up or emergency stops; and wherein the housing structure provides an illumination barrier or shield allowing the one or more rows of lights to emit light directed downwardly from inside the channel towards the ground preventing sideways illumination glare.

10. The trailer illumination device for illuminating a rear wheel assembly of a trailer of claim 9 wherein the plurality of lamps are light emitting diodes.

11. The trailer illumination device for illuminating a rear wheel assembly of a trailer of claim 9 wherein the lamps are halogen lamps.

12. The trailer illumination device for illuminating a rear wheel assembly of a trailer of claim 9 wherein the housing structure forming channel has an inside polished or highly reflective surface.

13. The trailer illumination device for illuminating a rear wheel assembly of a trailer of claim 9 wherein the lamps are encased in an acrylic or clear plastic tube or cover inside the channel.

14. The trailer illumination device of claim 9 wherein the housing structure has an opening for passing wiring out of to provide a means to connect to the wiring for the rear lights of the trailer.

15. The trailer illumination device of claim 9 wherein the extrusion has a "U" shape extrusion portion.

16. The trailer illumination device of claim 9 further comprises:

a pair of rear illumination devices for attachment to the rear of a trailer, one device for a left side and one for a right side of the rear of the trailer for back up illumination.

\* \* \* \* \*